(12) United States Patent
Seki et al.

(10) Patent No.: US 6,443,303 B1
(45) Date of Patent: Sep. 3, 2002

(54) PACKAGE FOR CASSETTE STORAGE CASE

(75) Inventors: Seizo Seki; Chie Iwamoto, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/604,932

(22) Filed: Jun. 28, 2000

(30) Foreign Application Priority Data

Jun. 29, 1999 (JP) .......................................... 11-183609

(51) Int. Cl.[7] .......................................... B65D 85/575
(52) U.S. Cl. .................................. 206/387.1; 229/87.05
(58) Field of Search ........................ 206/387.1, 387.11, 206/1.5, 460, 497, 499, 813; 299/87.05, 87.15

(56) References Cited

U.S. PATENT DOCUMENTS

| | | | | |
|---|---|---|---|---|
| 3,254,758 A | * | 6/1966 | Guyer | 206/497 |
| 3,581,979 A | * | 6/1971 | Fuchs | 299/87.05 |
| 3,987,901 A | * | 10/1976 | Dullinger | 206/460 |
| 5,487,503 A | * | 1/1996 | Sato et al. | 229/87.05 |
| 5,732,822 A | * | 3/1998 | Mitsuyama | 206/387.11 |

\* cited by examiner

*Primary Examiner*—Luan K. Bui
(74) *Attorney, Agent, or Firm*—Jay H. Maioli

(57) ABSTRACT

A package for a cassette storage case (2) that has a cassette insertion opening (4) formed at one lateral side thereof, cassette guide cuts (7) formed in main front and rear surfaces (5) and (6) thereof at the side of the opening (4), and a cassette receiving space (3) defined by the front and rear surfaces (5) and (6) and the other lateral side thereof, so that a tape cassette (1) is inserted into the cassette receiving space (3) through the cassette insertion opening (4). A sealing/packaging tape (1) is wound on the cassette storage case (2) across the cassette insertion opening (4) and (10) is wider than the cassette guide cuts (7) in the cassette storage case (2). Thus the sealing/packaging tape (10) covers the cassette guide cuts (7) to seal and wrap the cassette storage case (2). Thereby, a positive sealing and packaging can be realized with a reduced amount of the packaging material (to save the resources). This sealing and packaging permits to seal the cassette guide cuts (7) formed in the cassette storage case (2) being packaged, improve the appearance of the tape cassette as a commodity and facilitate unpacking of the cassette storage case (2).

7 Claims, 4 Drawing Sheets

PACKAGE FOR CASSETTE STORAGE CASE

BACKGROUND OF THE INVENTION

1. Field of the Invention

The present invention relates to a package for a cassette storage case, and more particularly, to a package for a cassette storage case having received therein a recording medium cassette—such as a video tape cassette or a cleaning cassette, formed by winding a packaging material on the cassette storage case to seal and wrap the latter.

2. Description of the Related Art

Referring now to FIG. 1, there is illustrated a video tape cassette and a cassette storage case used for storing the video tape cassette therein. The video tape cassette is indicated with a reference 1 and cassette storage case is with a reference 2. The video tape cassette 1 is for example adapted for use in a video tape recorder. It is housed in the cassette storage case 2 for supply to a user. The video tape cassette 1 is put in the cassette storage case 2 for storage or carrying. As shown, the cassette storage case 2 is formed as a generally rectangular thin box having the nearly same shape as the video tape cassette 1. The cassette storage case 2 is formed from a cardboard or a soft synthetic resin. The cassette storage case 2 has an inner space 3 generally equal in size to the video tape cassette 1 except that the depth or width is slightly larger. The video tape cassette 1 is received in the inner space 3 of the cassette storage case 2. The inner space 3 will be referred to as "cassette receiving space" hereunder.

As shown in FIG. 1, the cassette storage case 2 is open along one of the longitudinal sides of the cassette receiving space 3. The opening is indicated with a reference 4. The video tape cassette 1 is introduced into or taken out of the cassette receiving space 3 through the opening 4. The cassette storage case 2 consists of front and rear main surfaces 5 and 6 defining together the cassette receiving space 3 and having opening edges 5a and 6a, respectively. The front and rear main surfaces 5 and 6 have cuts 7a and 7b formed therein, respectively, at the side of the opening 4 and nearly in the middle of the case length. The cuts 7a and 7b are opposite to each other. The video tape cassette 1 can be pinched with fingers in the cuts 7a and 7b for easy removal from inside the cassette storage case 2. The cuts 7a and 7b will generically be referred to "cassette guide cuts 7" hereunder. Each of the cassette guide cuts 7 has a trapezoidal form of which the side at the opening 3 is longer.

As will be seen from the above description, when the video tape cassette 1 is fully received in the cassette receiving space 3 of the cassette storage case 2, a part thereof will be exposed in the cassette guide cuts 7. Namely, the cassette guide cuts 7 will make it easier to handle the video tape cassette in relation to the cassette storage case 2.

Normally, as a commodity for supply to a user, the video tape cassette 1 put in the cassette receiving space 3 of the cassette storage case 2 is wholly wrapped and sealed with a packaging material 100 as shown in FIG. 2. The packaging material 100 is formed from a transparent resin film sheet, for example, a polypropylene film sheet, to have a little larger size than the spread shape of the cassette storage case 2. The packaging material 100 has a cutting tape 101 thermally tacked to the inner surface thereof. The packaging material 100 can easily be cut by and along this cutting tape 101. For packaging the cassette storage case 2, it is first wrapped with the packaging material 100 so that the latter has a cylindrical shape, and then the cylinder of the packaging material 100 is folded at each end thereof so that the upper and lower portions thereof will overlap each other (which is a so-called "caramel packaging"). This packaging will seal the cassette storage case 2, which means that the video tape cassette 1 is an unused one, and also protect the cassette storage case 2 against dust and abrasion. The packaging material 100 is appropriately designed (not shown) for an esthetic appearance of the commodity.

Generally, two, three or five pieces of video tape cassette 1 are packaged together for sales in many cases. That is, the video tape cassette 1 is sold as a two-piece, three-piece or five-piece pack. In this case, each piece of the cassette storage case 2 having the video tape cassette 1 received therein is packaged with the packaging material 100 as in the above, then a predetermined number of the packaged cassette storage cases 2 are stacked together, and further the stack of the packaged cassette storage cases 2 is "caramel-packaged" with a packaging material 102 as shown in FIG. 3. This packaging material 102 is also formed from a transparent polypropylene film sheet having a slightly larger size than the spread shape of the stack of the cassette storage cases 2.

However, the above-mentioned packaging of the cassette storage case 2 needs a packaging material of a larger size than the cassette storage case 2 or the stack of the cassette storage cases 2 and thus it costs much, which is not consistent with the simple packaging asserted in the recent movements for resource conservation and environmental protection. Also, generally in the packaging of the cassette storage case 2, the cutting tape 101 is also formed from a transparent resin film and is closely tacked at the end thereof to the packaging material 102. Thus, the user will not easily be aware of the location of the opening end of the cutting tape 101 or the packaging material 102 cannot easily be opened by the cutting tape 101.

The invention of the present invention has already proposed a novel tape cassette sealing structure by which the problem of the packaging structure of the cassette storage case 2 could be overcome (as disclosed in the Japanese Unexamined Patent Publication No. 6-183458, titled "Tape Cassette Sealing Structure"). This conventional sealing structure is such that a sealing tape 110 is wound on the cassette storage case 2 as shown in FIG. 4. The sealing tape 110 is narrower than the cassette guide cuts 7 in the cassette storage case 2, and wound about the cassette storage case 2 at the cassette guide cuts 7 in a direction across the opening 4. As shown, the sealing tape 110 has opposite end portions 110a and 110b which will be placed to overlap each other and thermally tacked to each other.

In this conventional sealing structure, the sealing tape 110 has a sufficient width and length to wrap the above-mentioned portion of the cassette storage case 2 having the video tape cassette 1 received therein, so the above-mentioned simple packaging can be implemented. Namely, the packaging material cost and packaging steps can be reduced. Also, in this conventional sealing structure, the sealing tape 110 present on the cassette storage case 2 means that the video tape cassette 1 received in the case 2 is an unused one, and acts to seal the cassette storage case 2.

For unpacking the cassette storage case 2 to take out the video tape cassette 1 for use, the user has to cut the sealing tape 110 by inserting a cutter or the like under the sealing tape 110. This is possible since the sealing tape 110 is narrower than the cassette guide cuts 7. However, the conventional packaging structure makes it necessary to use the cutter or the like for cutting the sealing tape 110, and the cassette storage case 2 may possibly be cut or damaged by the cutter when unpacking the cassette storage case 2.

Also, for unpacking the cassette storage case 2, it is not impossible for the user to tear the sealing tape 110 with the finger introduced under the sealing tape 110, which however is very difficult because of the elasticity of the sealing tape 110. Further, when the user tries to unpack as in the above, the cassette storage case 2 may possibly be deformed or the sealing tape 110 is likely to be caught at the cassette guide cuts 7 and thus be rolled up and broken at the edges thereof Moreover, when the cassette storage case 2 is packaged in the above conventional manner, the sealing tape 110 will possibly override the lateral edges of the cassette guide cuts 7 and thus be creased or roll up the edges of the cassette storage case 2 to form a projection whose height is approximately the thickness of the cassette storage case 2 (which will be referred to as "step" hereunder). The "step" will make a clearance between the packaged cassette storage cases placed in stack. In this case, the conventional package will rather spoil the appearance of the cassette storage cases 2. The packaged cassette storage cases cannot neatly be displayed as commodities in stack or otherwise on the shop counter.

OBJECT AND SUMMARY OF THE INVENTION

Accordingly, the present invention has an object to overcome the above-mentioned drawbacks of the prior art by providing a cassette storage case package including the features of the tape cassette sealing structure according to the above-mentioned Applicant's invention, and further adapted to positively package the cassette storage case with a reduced amount of packaging material (saving of resources), prevent damage to the cassette guide cut formed in the cassette storage case being package, improve the appearance of the cassette storage case as a commodity and facilitate unpacking.

The above object can be attained by providing a cassette storage case package formed from a sealing/packaging tape which is wound on a cassette storage case open at one lateral side thereof for insertion of a cassette into the cassette storage case as well as for removal from the cassette storage case and having cassette guide cuts formed in main surfaces thereof at the open side as well as having defined therein a cassette receiving space in which a cassette is received through the cassette insertion opening.

The sealing/packaging tape is wider than the cassette guide cuts in the cassette storage case and wound on the cassette storage case across the cassette insertion opening to cover the cassette guide cuts, thereby sealing and packaging the cassette storage case.

Also the above object can be attained by providing a cassette storage case package formed from a sealing/packaging tape which is wound on a stack of cassette storage cases each open at one lateral side thereof for insertion of a cassette into the cassette storage case as well as for removal from the cassette storage case and having cassette guide cuts formed in main surfaces thereof at the open side as well as having defined therein a cassette receiving space in which a cassette is received through the cassette insertion opening.

The sealing/packaging tape is wider than the cassette guide cuts in the cassette storage case and wound on the stack of the cassette storage cases across the cassette insertion openings to cover the cassette guide cuts, thereby sealing and packaging the stack of the cassette storage cases.

According to the present invention, the cassette storage case packaging constructed as in the above can be made using a sealing/packaging tape having a sufficient length to extend around one cassette storage case or stack of the cassette storage cases in the lateral direction, which contributes very much to a simplified packaging and saving of the packaging material (resources). Also, the cassette insertion opening of the cassette storage case is closed with the sealing/packaging tape, which assures the users that a tape cassette contained in the cassette storage case is an unused one. Further, the sealing/packaging tape covers the cassette guide cuts as a whole so that the sealing/packaging tape will not break or roll up the edges of the cassette guide cuts to form a "step", which would be in the conventional cassette storage case packaging. Thus, a plurality of the cassette storage cases packaged according to the present invention can be placed in stack with no "step" between the packaged cassette storage cases. Namely, the packaged cassette storage cases can neatly be displayed as commodities in stack or otherwise on the shop counter.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

Figure 1:
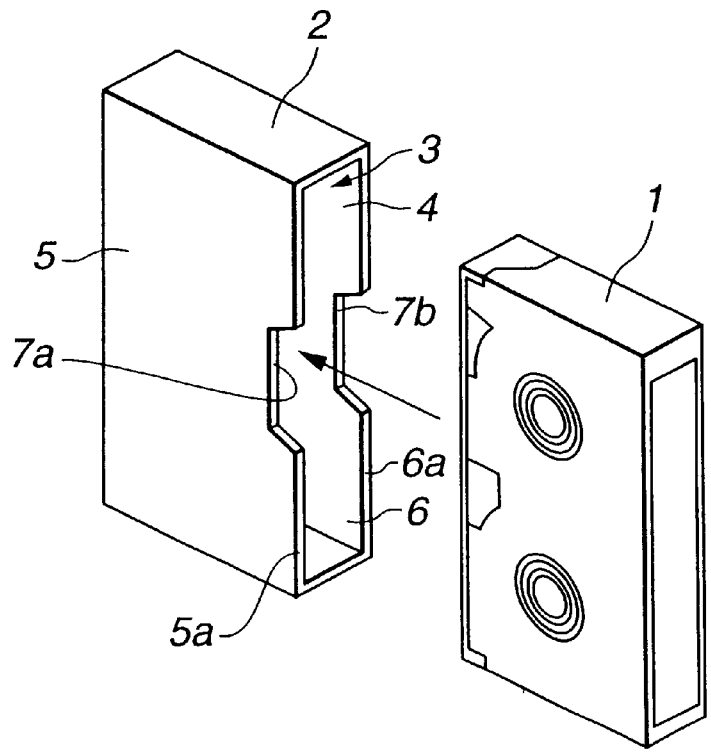
FIG. 1 is a perspective view of a video tape cassette and a cassette storage case used for storing the video tape cassette therein.
Figure 2:
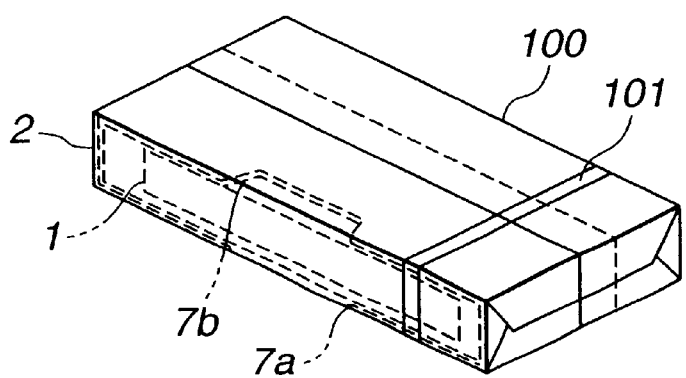
FIG. 2 is a perspective view of an example of conventional cassette storage case package.
Figure 3:
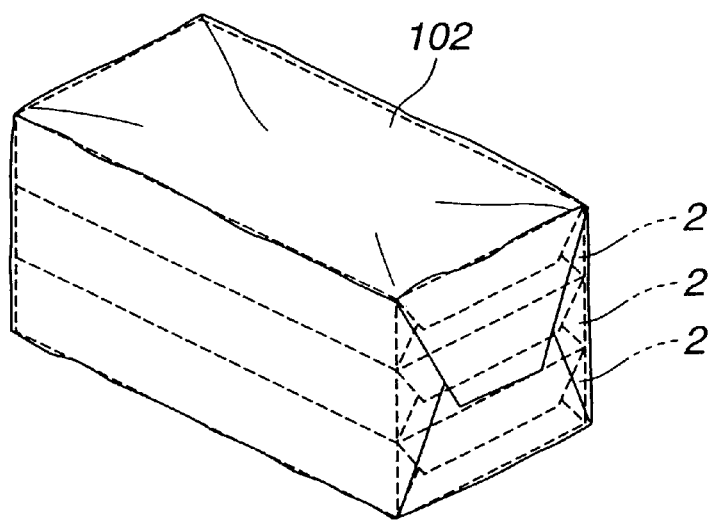
FIG. 3 is a perspective view of a so-called caramel packaging of a cassette storage case in which a cassette is received.
Figure 4:
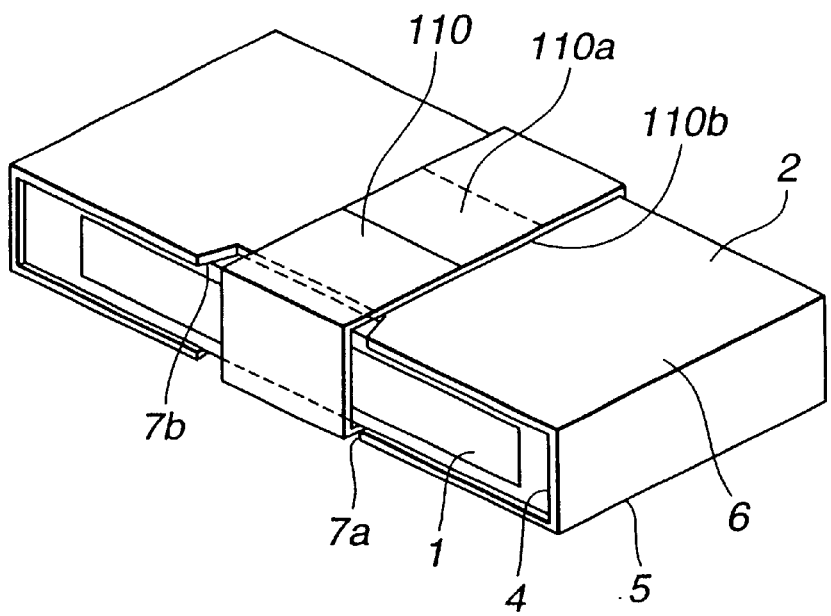
FIG. 4 is a perspective view of another example of conventional cassette storage case package.
Figure 5:
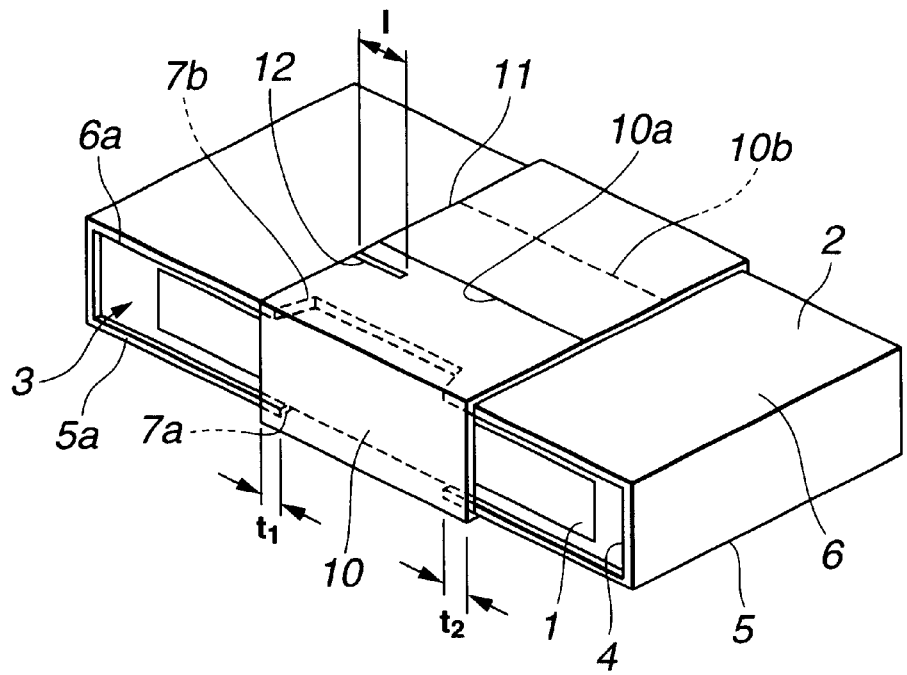
FIG. 5 is a perspective view of a first embodiment of the present invention, applied to a cassette storage case in which a video tape cassette is received.

Referring now to FIG. 5, there is schematically illustrated the first embodiment of the present invention, applied to a cassette storage case in which a video tape cassette is received, as in the aforementioned conventional cassette storage case package, to seal and wrap the cassette storage case using a sealing/packaging tape. Therefore, the video tape cassette and cassette storage case will be indicated with the same reference numerals as those used in the above description of the convention package and will not further be described below. Also, the same elements as those shown in FIGS. 1 to 4 will be indicated in FIG. 5 with the same reference numerals as in FIGS. 1 to 4. The sealing/packaging tape is indicated with a reference 10.

The sealing/packaging tape 10 is formed from a transparent or translucent resin film sheet, for example, a polypropylene film sheet, having a width somewhat larger than that of cassette guide cuts 7 formed in the cassette storage case 2. The sealing/packaging tape 10 has opposite end portions 10a and 10b and such a sufficient length that the end portions 10a and 10b of the tape 10 wound one turn on the cassette storage case 2 laterally at the longitudinal middle can be superposed on each other to a splice. Note that generally, the sealing/packaging tape 10 is wound long on a supply reel of a packaging machine located along a packaging line and continuously supplied to the cassette storage case 2 to be packaged as will further be described later. After being wound on the cassette storage case 2 in a predetermined manner, the sealing/packaging tape 10 will be cut by a cutter.

The sealing/packaging tape 10 should preferably be relatively inexpensive and 20 to 30 μm so, as more preferably 25 μm not to easily be creased and to be easily cut away once it is wound on the cassette storage case 2. If the sealing/packaging tape 10 is thinner than 20 μm, it is easy to be creased, which will possibly spoil the appearance of the cassette storage case as a commodity. If it is thicker than 30 μm, it cannot easily be cut for unpacking the cassette storage case 2.

The sealing/packaging tape 10 should preferably have a shrinkage percentage of 2 to 8%, more preferably, 4% in the lateral direction thereof and 7% in the longitudinal direction. If the shrinkage percentage is higher than 8%, the sealing/packaging tape 10 will be wound and fastened on the cassette storage case 2 with so large a force that the tape 10 cannot easily be removed. If the shrinkage percentage is under 2%, the tape 10 will not stably be wound in place on the cassette storage case 2 but will be wound out of place. If the sealing/packaging tape 10 is wound out of place on the cassette storage case 2, it will spoil the appearance of the cassette storage case 2 as a commodity. If it is caught by a part of the packaging machine, it will possibly cause a trouble or danger. Of course, the shrinkage percentage of the sealing/packaging tape 10 may be same in both the lateral and longitudinal directions as long as it falls within the above-specified range.

As shown in FIG. 5, the sealing/packaging tape 10 having the aforementioned characteristics is wound on, and laterally of, the cassette storage case 2 having the video tape cassette 1 received in the cassette receiving space 3 thereof, across the cassette insertion opening 4 at the middle of the case length, to thereby seal and wrap the cassette storage case 2. With the sealing/packaging tape 10 wound on the cassette storage case 2, the end portions 10a and 10b are placed to overlap each other and tacked to each other by heat sealing. Thus, the sealing/packaging tape 10 will take a general shape of a rectangular cylinder.

As in the above, the sealing/packaging tape 10 has a width larger than the opening width of the cassette guide cuts 7 in the cassette storage case 2 to cover the cassette guide cuts as a whole. As shown in FIG. 5, the sealing/packaging tape 10 is wound on the cassette storage case 2 to cover the main surfaces 5 and 6 of the case 2 in such a manner that distances t1 and t2 between the ends of the cassette guide cuts 7 and corresponding lateral sides of the tape 10 will be at least 10 mm, preferably, 5 to 7 mm.

If the distances t1 and t2 are shorter than the above-specified range, either of the lateral sides of the sealing/packaging tape 10 will possibly enter into the cassette guide cuts 7 or override the lateral edges of the cuts 7 due to a deviation originating from the precision, if not high, of the packaging machine or the like. In such a case, trouble will take place as in the previously described conventional cassette storage packages. If the sealing/packaging tape 10 is caught in the cassette guide cuts 7, it cannot be removed from on the cassette storage case 2 by sliding longitudinally of the cassette storage case 2. If the sealing/packaging tape 10 is designed wider than the aforementioned range, the material cost can only be reduced at a low rat.

The sealing/packaging tape 10 can be removed from on the cassette storage case 2 by sliding it longitudinally of the case 2, which makes it unnecessary to use a cutter or like for removing the sealing/packaging tape 10 from the cassette storage case 2. Some users will try to cut the sealing/packaging tape 10 by forcibly inserting the finger under the tape 10. For such users, a tape cutting guide slit 12 is formed in the seal/packaging tape 10. The tape cutting guide slit 12 extends from at least one lateral side 11 of the tape 10 laterally of the tape 10. It is 2 to 3 mm long.

If the tape cutting guide slit 12 is shorter than 2 mm, it will not work well for cutting the sealing/packaging tape 10. The tape cutting guide slit 12 longer than 3 mm will possibly result in a part of the tape 10 being rolled up, which will spoil the appearance of the package, or in a cut to the other lateral side of the tape 10. The tape cutting guide slit 12 may be formed anywhere in the sealing/packaging tape 10, but it should not preferably be formed in the tape ends 10a and 10b which have an increased strength since they are placed to overlap each other and tacked to each other, or a tape portion near the cassette insertion opening 4, on which a bias caused by a slight deformation of the opening 4 will act.

The sealing/packaging tape 10 is thus wounded on the cassette storage case 2 having the video tape cassette 1 received in the cassette receiving space 3 thereof to cover the cassette insertion guide cuts 7 and close the cassette insertion opening 4 as in the above. Thus, it can positively be known from this packaging that the video tape cassette 1 received in the cassette storage case 2 is an unused one. Since the sealing/packaging tape 10 wound on the cassette storage case 2 is designed to have a sufficient length to extend around one cassette storage case 2 laterally of the latter and seal and wrap he cassette storage case 2 in the conventional manner, which will thus contribute very much to a saving of the packaging material (resources) and simplified packaging. Also, the packaging costs are thus reduced.

The sealing/packaging tape 10 covers the cassette insertion guide cuts 7, as a whole, in the cassette storage case 2 so that the edges of the cuts 7 will be prevented from being rolled up and broken during transportation and handling. Also, since no "step" results, the packaged cassette storage cases can neatly be displayed as commodities in stack on the shop counter.

Figure 6:
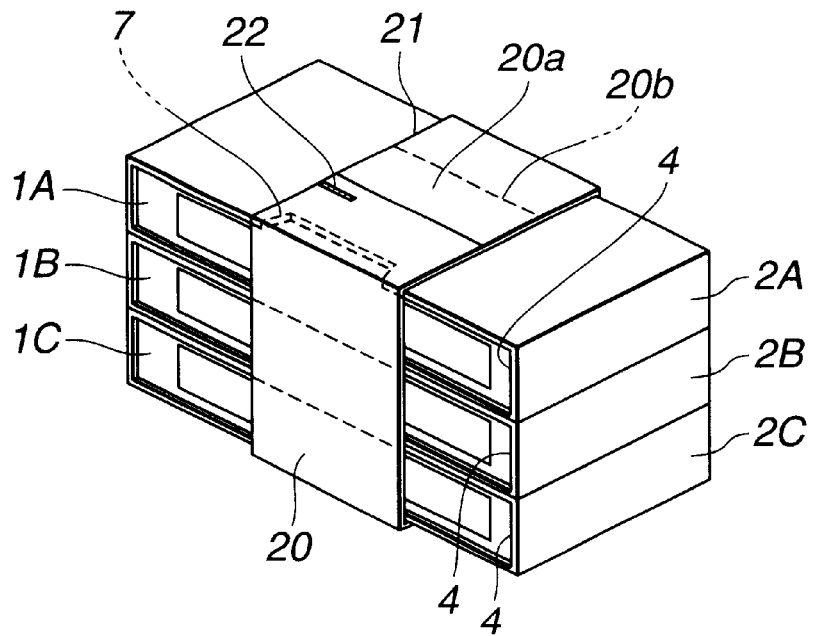
FIG. 6 is a perspective view of an application of the present invention to a stack of cassette storage cases.

Also, according to the present invention, a plurality of video tape cassettes 1 can be packaged together. FIG. 6 is a perspective view of an application of the present invention to a stack of cassette storage cases. As shown, a plurality of cassette storage cases 2A to 2C is placed in stack in the direction of their thickness and with the cassette insertion guide cuts 7 being at the same side. They are sealed and packaged together with a sealing/packaging tape 20 wound on them. The sealing/packaging tape 20 has characteristics equivalent to those of the aforementioned sealing/packaging tape 10, and has opposite end portions 20a and 20b. It has also such a sufficient length that the end portions 20a and 20b of the tape 10 wound one turn on the cassette storage cases 2A to 2C laterally at the longitudinal middle can be superposed on each other to form a splice.

As shown, the sealing/packaging tape 20 is wound on an assembly of the cassette storage cases 2A to 2C each having the video tape cassette 1 received in the cassette receiving space 3 thereof. In this case, the tape 20 is wound laterally of the cases 2A to 2C at the longitudinal middle of the latter across the cassette insertion guide openings 4 to close a part of the opening 4. Thus, the sealing/packaging tape 20 seals and packages the assembly of the cassette storage cases 2A to 2C. The sealing/packaging tape 20 thus wound on the cassette storage cases 2A to 2C has the opposite ends 20a and 20b placed to overlap each other and tacked to each other by heat sealing. Thus, the sealing/packaging tape 20 takes a generally cylindrical shape.

The sealing/packaging tape 20 has a width larger than that of the opening width of the cassette insertion guide cuts 7 in the cassette storage cases 2A to 2C to entirely cover the guide cuts 7. Similarly to the aforementioned sealing/ packaging tape 10, the sealing/ packaging tape 20 is wound on the assembly of the cassette storage cases 2A to 2C in such a manner that distances between the ends of the cassette guide cuts 7 and corresponding lateral sides of the tape 10 will be at least 10 mm or less. Further, there is formed in the sealing/packaging tape 20 a tape cutting guide slit 22 extending laterally from at least one lateral side 21 of the tape 20. It is 2 to 3 mm long.

The sealing/packaging tape 20 is thus wound on the assembly of the cassette storage cases 2 to cover the cassette insertion guide cuts 7 and close the cassette insertion openings 4 as in the above. Thus it can positively be known from this packaging that the video tape cassettes 1 received in the respective cassette storage cases 2A to 2C are unused ones. Since the sealing/packaging tape 20 wound on the assembly of the cassette storage cases 2A to 2C is designed to have a sufficient length to extend around the assembly laterally and seal and wrap the cassette storage cases 2A to 2C in the conventional manner, which will thus contribute very much to a saving of the packaging material (resources) and simplified packaging. Also, the packaging costs are thus reduced.

The assembly of the cassette storage cases 2A to 2C is sealed and packaged with the sealing/packaging tape 20 different in length from the sealing/packaging tape 10 for one cassette storage case 2 as in the above but having the same characteristics as those of the tape 10. Therefore, the assembly of the cassette storage cases 2A to 2C can be packaged while a single cassette storage case 2 is being packaged, which will enable a further simplified packaging process.

The sealing/packaging tape 20 covers entirely the cassette insertion guide cuts 7 in the cassette storage cases 2A to 2C in the assembly so that the edges of the cuts 7 will be prevented from being rolled up and broken during transportation and handling. Also, since no "step" results, many packs of cassette storage cases can neatly be displayed as commodities in stack on the shop counter.

Figure 7:
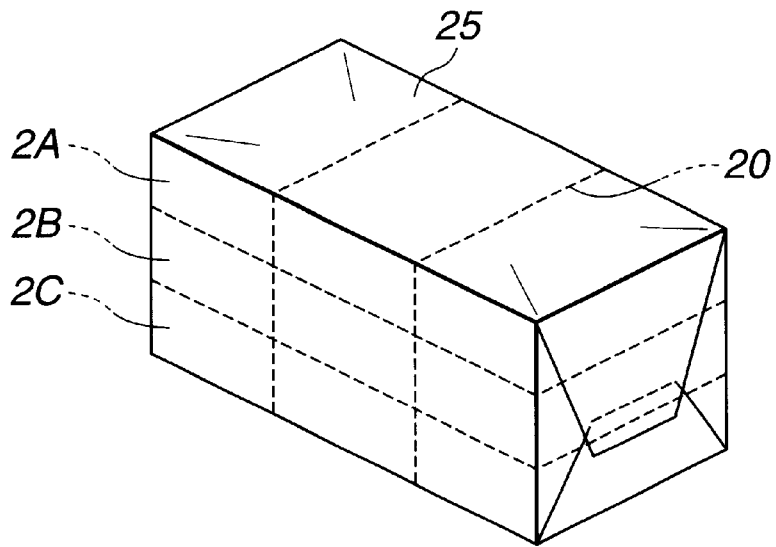
FIG. 7 is a perspective view of a so-called caramel packaging of a stack of cassette storage cases.

FIG. 7 is a perspective view of a so-called caramel packaging of a stack of cassette storage cases. In this caramel packaging, a packaging sheet 25 is wound on the entire assembly of the cassette storage cases 2A to 2C, already packaged with the sealing/packaging tape 20 as in the above. The packaging sheet 25 is formed from a transparent or translucent resin film sheet, for example, polypropylene film sheet. The packaging sheet 25 is appropriately designed (not shown) for an esthetic appearance of the commodity.

Figure 8:
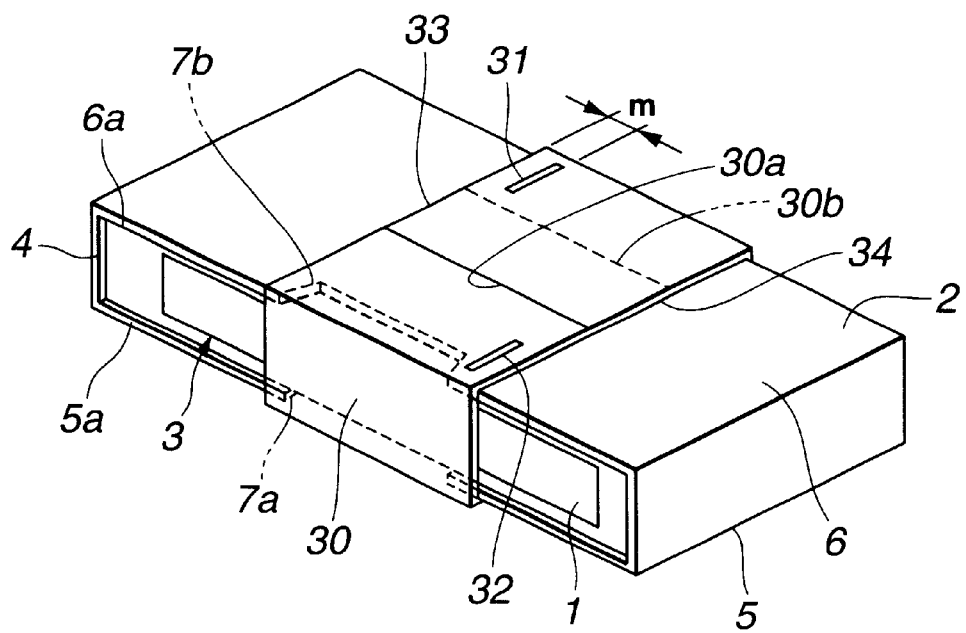
FIG. 8 is a perspective view of a second embodiment of the present invention, applied to a cassette storage case in which a video tape cassette is received.

The sealing/packaging tape used in the present invention is not limited to the aforementioned structure of the sealing/ packaging tapes 10 and 20. The second embodiment of the present invention, applied to a cassette storage case in which a video tape cassette is received, will be described herebelow with reference to FIG. 8. As shown, the sealing/ packaging tape is indicated with a reference 30, and it has tape cutting guide slits 31 and 32 formed therein. The sealing/packaging tape 30 has characteristics equivalent to those of the aforementioned sealing/packaging tape 10, and has opposite end portions 30a and 30b. It has also such a sufficient length that the end portions 30a and 30b of the tape 30 wound one turn on the cassette storage case 2 laterally at the longitudinal middle can be superposed on each other to form a splice. As shown, the sealing/packaging tape 30 is wound on the cassette storage case 2 having the video tape cassette 1 received in the cassette receiving space 3 thereof. In this case, the sealing/packaging tape 30 is wound on and laterally of the cassette storage case 2 at the longitudinal middle of the latter across the cassette insertion guide openings 4 to close a part of the opening 4. Thus, the sealing/packaging tape 30 seals and packages the cassette storage case 2.

The sealing/packaging tape 30 thus wound on the cassette storage case 2 has the opposite ends 30a and 30b placed to overlap each other and tacked to each other by heat sealing. Thus, the sealing/packaging tape 30 takes a generally cylindrical shape. The sealing/packaging tape 30 has a width larger than that of the opening width of the cassette insertion guide cuts 7 in the cassette storage case 2 to entirely cover the guide cuts 7.

The sealing/packaging tape 30 has the tape cutting guide slits 31 and 32 formed longitudinally hereof along lateral sides 33 and 34, respectively. The cutting guide slits 31 and 32 are 2 to 3 mm. The tape cutting guide slits 31 and 32 are formed in parallel to the lateral sides 33 and 34, respectively, with a distance m of 10 mm or less between the slits 31 and 32 and lateral sides 33 and 34, respectively. Of course, the tape cutting guide slits 31 and 32 may be formed at one of the lateral sides of the sealing/packaging tape 30, and more than two such guide slits may be formed in the tape 30.

Owing to the tape cutting guide slits 31 and 32 formed along the lateral sides 33 and 34, respectively, of the sealing/packaging tape 30, the user can cut the tape 30 with the finger inserted between the tape 30 and the front face of the cassette storage case 2. However, if the above distance m is larger than 10 mm, the tape cutting guide slits 31 and 32 will not work well when the user tries to cut the sealing/packaging tape 30 with the finger inserted as in the above. Since the tape cutting guide slits 31 and 32 are formed in the sealing/packaging tape 30 along the lateral sides 33 and 34, the user can cut or tear off the tape 30 off by inserting the finger under the tape 30 from either the lateral side 33 or 34. If the tape cutting guide slits 31 and 32 are longer than 3 mm, the portion of the sealing/packaging tape 30 other than the tape cutting guide slit is likely to break and rolled up. It so, the rolled-up portion of the tape 30 will spoils the appearance of the cassette storage case 2 as a commodity, or it will be torn off while the case 2 is being handled. Also, if the tape cutting guide slits 31 and 32 formed in the sealing/packaging tape 30 are shorter than 2 mm, they will not possibly work well. The tape cutting guide slits 31 and 32 may be formed anywhere in the sealing/ packaging tape 30, but they should not preferably be formed in the tape ends 30a and 30b which have an increased strength since they are placed to overlap each other and tacked to each other, or a tape portion near the cassette insertion opening 4, on which a bias caused by a slight deformation of the opening 4 will act.

In the foregoing, there have been described the applications of the present invention to the sealing and packaging of the cassette storage case 2 having the video tape cassette 1 received therein. However, these applications are just non-limitative embodiments of the present invention, and the present invention can be applied to sealing and packaging of a disc storage case in which a disc-like recording medium such as floppy disc, magneto-optical disc or mini disc is housed. The disc storage case has defined therein a disc receiving space is open at one lateral side of the disc storage case, and a disc is inserted into the case through the opening. The disc storage case has disc insertion guide cuts formed in the opening edges of the front and read main sides of the disc storage case, defining together the disc insertion opening. Therefore, such a disc storage case may be sealed and packaged with a similar sealing/packaging tape to the aforementioned ones.

Also, the present invention is applicable to sealing and packaging of a cleaning cassette formed in the same shape as the video tape cassette 1 or disc cassette and having a cleaning tape or cleaning disc housed therein.

What is claimed is:

1. A combination of a cassette storage case and a cassette storage case package comprising:

a cassette storage case open at one lateral side thereof for insertion and removal of a cassette into and from the cassette storage case and having cassette guide cuts of a predetermined length formed in main surfaces of the cassette storage case at the open side and having defined therein a cassette receiving space in which a cassette in received through the cassette insertion opening; and sealing/packaging tape having a width wider than the predetermined length of the cassette guide cuts in the cassette storage case and being wound on the cassette storage case across the cassette insertion opening to cover the cassette guide cuts, so that the wound tape can be slid off of the cassette storage case, whereby the wound tape packages the cassette in the cassette storage case and solely retains the cassette in the cassette storage case, wherein the sealing/packaging tape is wider by 10–20 mm than the cassette guide cuts.

2. A combination of a plurality of cassette storage cases and a cassette storage case package comprising:

a plurality of cassette storage cases arranged in a stack, each of the cassette storage cases being open at one lateral side thereof for insertion and removal of a cassette into and from each cassette storage case and having cassette guide cuts of a predetermined length formed in main surfaces of each case at the open side and each having defined therein a cassette receiving space in which a cassette is received through the cassette insertion opening; and a sealing/packaging tape having a width wider than the predetermined length of the cassette guide cuts in the cassette storage case and having a length sufficient to be wound around the plurality of cassette storage cases arranged in a stack across all of the cassette insertion openings to cover the cassette guide cuts, so that the wound tape can be slid off the stack of cassette storage cases, whereby the wound tape packages the stack of cassette storage cases and solely retains the plurality of cassettes in the respective plurality of cassette storage cases, wherein the sealing/packaging tape is wider by 10–20 mm than the cassette guide cuts.

3. The combination of a cassette storage case and a cassette storage case package as set forth in claim 1 or 2, wherein the sealing/packaging tape is formed from a resin film sheet of 20 to 30 $\mu$m in thickness.

4. The combination of a cassette storage case and a cassette storage case package as set forth in claim 1 or 2, wherein the sealing/packaging tape is formed from a resin film sheet whose shrinkage percentage is 2 to 8%.

5. The combination of a cassette storage case and a cassette storage case package as set forth in claim 1 or 2, wherein the sealing/packaging tape has formed therein at least a tape cutting guide slit.

6. The combination of a cassette storage case and a cassette storage case package as set forth in claim 5, wherein the tape cutting guide slit formed in the sealing/packaging tape is open at one lateral side of the sealing/packaging tape and extends 2 to 3 mm laterally of the sealing/packaging tape.

7. The combination of a cassette storage case and a cassette storage case package as set forth in claim 5, wherein the tape cutting guide slit formed in the sealing/packaging tape extends longitudinally along one lateral side of the sealing/packaging tape at a position of 10 mm or less from the lateral side.

* * * * *